United States Patent [19]
Palviainen

[11] Patent Number: 5,920,812
[45] Date of Patent: Jul. 6, 1999

[54] CALL FORWARDING METHOD AND ARRANGEMENT FOR A MOBILE TERMINATING CALL

[75] Inventor: Keijo Palviainen, Helsinki, Finland

[73] Assignee: Nokia Telecommunications Oy, Espoo, Finland

[21] Appl. No.: 08/578,603

[22] PCT Filed: May 2, 1995

[86] PCT No.: PCT/FI95/00236

§ 371 Date: Jan. 4, 1996

§ 102(e) Date: Jan. 4, 1996

[87] PCT Pub. No.: WO95/31076

PCT Pub. Date: Nov. 16, 1995

[30] Foreign Application Priority Data

May 4, 1994 [FI] Finland ................................ 942053

[51] Int. Cl.[6] ........................... H04M 3/42; H04M 1/00; H04Q 7/38
[52] U.S. Cl. ......................... 455/417; 379/157; 379/201
[58] Field of Search .................................. 379/157, 201, 379/211, 164, 172; 455/417, 415, 432, 445

[56] References Cited

U.S. PATENT DOCUMENTS

| | | |
|---|---|---|
| 4,278,844 | 7/1981 | Jones . |
| 4,893,336 | 1/1990 | Wuthnow .................................. 379/211 |
| 5,168,517 | 12/1992 | Waldman . |
| 5,274,699 | 12/1993 | Ranz ........................................ 379/142 |
| 5,506,888 | 4/1996 | Hayes et al. ............................ 379/210 |
| 5,526,400 | 6/1996 | Nguyen . |
| 5,572,585 | 11/1996 | Tsutsui .................................... 379/242 |
| 5,579,375 | 11/1996 | Ginter ..................................... 379/211 |

FOREIGN PATENT DOCUMENTS

| | | |
|---|---|---|
| 2 244 409 | 11/1991 | United Kingdom . |
| 94/05124 | 3/1994 | WIPO . |

*Primary Examiner*—William Cumming
*Attorney, Agent, or Firm*—Pillsbury Madison & Sutro LLP

[57] ABSTRACT

A call forwarding method and arrangement for a mobile terminating call, for preventing the taped intermediate announcements that are often made during call forwarding, and which can cause a delay in the call set-up, from possibly causing the time-out of the calling modem or telefax terminal and thus the failure of the call. Information concerning the type of call is transmitted to the mobile exchange handling the call included, for instance, in a message where the subscriber database notifies the carrying-out of call forwarding, and provides a call forwarding number. The mobile exchange implementing the call forwarding checks the type data of the call and omits possible intermediate announcements associated with the call forwarding in case of a data call, but allows intermediate announcements in case of speech calls.

6 Claims, 4 Drawing Sheets

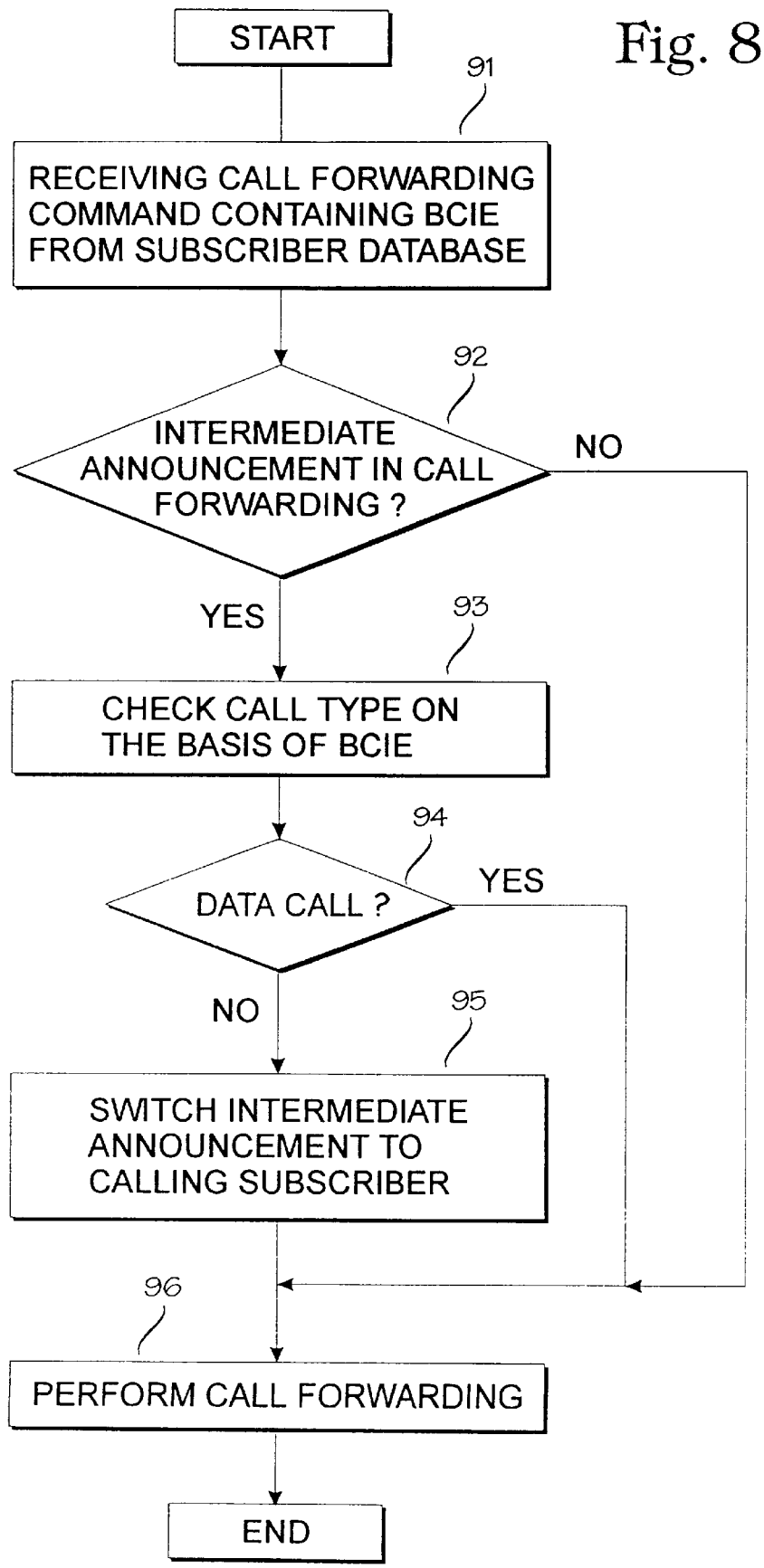

5,920,812

CALL FORWARDING METHOD AND ARRANGEMENT FOR A MOBILE TERMINATING CALL

This application claims benefit of International application PCT/Fl95/00236 filed May 2, 1995.

FIELD OF THE INVENTION

The present invention relates to a call forwarding method for a mobile terminating call, including the steps of receiving a call, checking whether call forwarding is activated for the called subscriber, and, if it is, starting the activated call forwarding, with which is possibly associated an intermediate announcement to the calling subscriber. The invention further relates to a mobile communication system arranged for accomplishing such call forwarding.

BACKGROUND OF THE INVENTION

Present-day mobile communication systems offer subscribers different data transmission features in addition to the conventional speech transmission. The data services of mobile communication systems can generally be divided into teleservices and bearer services. A bearer service is a telecommunication service, which provides signal transmission between user and network interfaces. For instance, modem services are bearer services whereas a telephone service and telefax service are teleservices. Data services are typically circuit-switched, which means that when using some services, a subscriber makes a call, during which data transmission takes place in the same manner as speech transmission during a speech call. However, mobile communication systems are not designed to take into account in all situations whether a circuit-switched connection is used for speech or data transmission but they handle different types of calls in the same manner, which causes problems in some situations.

One subscriber facility of the present-day mobile communication systems is call forwarding, which a subscriber can activate. Call forwarding may be unconditional call forwarding, a call being thus always forwarded to a given different number than that entered by the calling party. Call forwarding can also be arranged to take place conditionally, for instance when the subscriber is busy, the subscriber does not answer or the subscriber is not reached.

Another aspect of the present-day mobile communication systems is that a mobile exchange can switch audio-format information to a subscriber during different phases of a call. Audio information can be divided into announcements and audible tones. An announcement is a recorded or synthesized speech message. An announcement may be chargeable or charge-free to the calling subscriber. An announcement can also be switched to the calling subscriber during call set-up, in which case a so-called intermediate announcement is provided. For instance, in connection with call forwarding, the calling subscriber is informed of the forwarding of the call with a special intermediate announcement. Mobile communication network operators want to make this type of chargeable intermediate announcements of call forwardings, because otherwise, the functions of a network would be used free of charge in this type of situation in cases where neither the calling subscriber nor the subscriber of the call forwarding number are in the operator's network.

Intermediate announcements of this type are problematic in connection with data calls. Both a modem and a telefax modem wait for an answer signal under time-out control. The time-out of a telefax modem conventionally is 30–40 seconds, and the time-out of a modem is not defined in standards. The intermediate announcements made in connection with call forwarding may cause call set-up time to be prolonged to exceed the determined time limits, as a result of which the calling data modem or telefax modem assumes that the call attempt has failed and disconnects the call. As regards data calls, all long intermediate announcements are problematic, especially in connection with call forwarding on no reply. In addition, modems and telefax terminals can in no manner utilize the announcements, subscribers thus having to pay for unnecessary announcements. The same applies to all other data terminal equipments. The most unfortunate situation is where a subscriber is charged for a chargeable intermediate announcement, but the call set-up fails due to a delay caused by the intermediate announcement.

Thus, a need exists for preventing intermediate announcements from being made in connection with data calls. In the present-day mobile communication systems, this need has in no manner been taken into account, and the exchanges making intermediate announcements, for instance transit exchanges or terminal exchanges, do not at present even know the type of a mobile terminating call in connection with call forwarding, and they do not have any facilities for checking the type of call and for preventing intermediate announcements in connection with data calls.

SUMMARY OF THE INVENTION

The object of the present invention is to prevent the failure of the call set-up of data calls due to intermediate announcements made during call forwarding, and to prevent unnecessary intermediate announcements.

This is achieved with the method described in the foregoing BACKGROUND section, characterized according to the invention by checking in case of call forwarding whether the type of the call is a speech call or a data call, preventing the intermediate announcement in case of a data call, and allowing the intermediate announcement in case of a speech call.

The invention also relates to an arrangement for carrying out call forwarding in a mobile communication system comprising mobile stations, mobile exchanges and subscriber databases for maintaining user data, such as location data and activated services, in which arrangement a mobile exchange is provided with means for making intermediate announcements to the calling subscriber in connection with carrying out activated call forwarding. The arrangement is characterized according to the invention in that the mobile exchange is arranged to check in case of call forwarding being in an activated state in respect to a called number of a subscriber whether the type of the mobile terminating call is a data call or speech call, and to prevent intermediate announcements to be made in case of data calls, but to allow intermediate announcements to be made in case of speech calls.

The mobile exchange handling a call is informed of the fact that call forwarding is in an activated state for the called subscriber by some subscriber database of the network, this database usually also knowing the type of the call. Alternatively, this information can arrive with a call to be routed from a fixed network. In the preferred embodiment of the invention, information concerning the type of the call is transmitted to the mobile exchange as included, for instance, in a message where the subscriber database notifies the carrying out of call forwarding and gives a number to which the forwarding is to be performed. The mobile exchange implementing the call forwarding checks the type data of the call and omits possible intermediate announcements relating to the call forwarding in connection with a data call and allows intermediate announcements in connection with speech calls. The mobile exchange implementing the call forwarding may be a transit exchange routing the call or a terminating exchange serving the mobile station, to which exchange the call is routed.

According to an embodiment of the invention, the call forwarding method in connection with a terminating exchange comprises the steps of receiving a call in a first exchange; performing a routing information interrogation to a first database indicated by the directory number of the called subscriber; performing a roaming number interrogation from the first database to a second database, within the area of which the called subscriber is located; transmitting the allocated roaming number from the second database to the first database and further to the first exchange; routing the call on the basis of the roaming number from the first exchange to a second exchange, which serves the area of said second database; observing at the second exchange that the called subscriber is busy, not reachable or does not answer; checking in the second database whether call forwarding is activated for the subscriber; initiating the activated call forwarding; checking on the basis of the information obtained from the second database or in a call set-up message whether the call is a speech call or a data call; preventing an intermediate announcement possibly associated with the call forwarding in case of a data call from being made, and; allowing the making of an intermediate announcement possibly associated with the call forwarding in case of a speech call.

According to a second embodiment of the invention, the call forwarding method in connection with a transit exchange comprises the steps of receiving a call in a first exchange; performing a routing information interrogation to a first database indicated by the directory number of the called subscriber; observing in the first database that call forwarding is activated for the called subscriber; starting the call forwarding; checking on the basis of the information obtained from the first database or in a call set-up message whether the call is a speech call or a data call; preventing an intermediate announcement possibly associated with the call forwarding in case of a data call from being made, and; allowing the making of an intermediate announcement possibly associated with the call forwarding in case of a speech call.

BRIEF DESCRIPTION OF THE DRAWINGS

The invention will be described in more detail by means of the preferred embodiments with reference to the accompanying drawings, in which:

FIG. 8 is a flow diagram for describing the inventive operation of the mobile exchange.

DETAILED DESCRIPTION OF EMBODIMENTS OF THE INVENTION

The present invention can be used in mobile communication systems in which circuit-switched data and speech calls can be established. The invention can be used particularly advantageously in the pan-European digital mobile communication system GSM (Global System for Mobile Communications) and in more recently develop mobile communications systems of the same type, such as DCS1800 (Digital Communication System) and PCN (Personal Communication Network). In the following, the preferred embodiment of the invention will be described as implemented in the GSM system, without restricting the invention to it, however.

Figure 1:
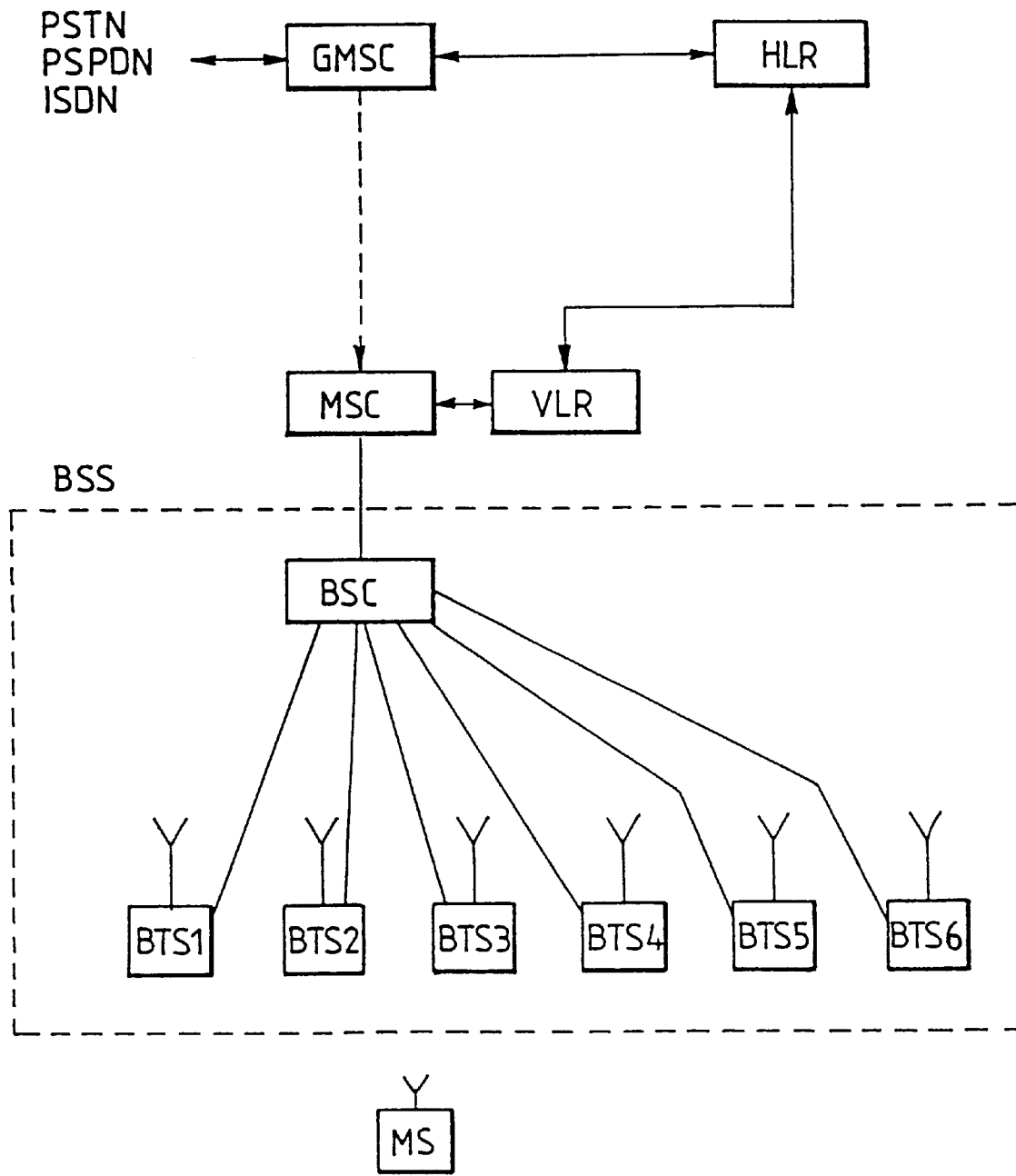
FIG. 1 shows a part of a mobile communication system.

In FIG. 1, the basic elements of the GSM system will be described very briefly, without further treatment of their characteristics or the other areas of the system. As to the more detailed description of the GSM system, the GSM Recommendations, which are publicly available from the European Standards Institute (ETSI), Sofia Antipolis, Valbonne, France (those in effect as of May 4, 1994), and the book "The GSM system for Mobile Communications", M. Mouly & M. Pautet, Palaiseau, France, 1992, ISBN:2-9507190-0-7, are referred to.

A mobile exchange MSC handles the switching of inbound and outbound calls. It performs tasks of a similar type as an exchange in a public switched telephone network (PSTN). In addition to these tasks, it also performs functions characteristic of mobile call traffic only, such as subscriber location management, in co-operation with the subscriber registers of the network. The GSM system comprises home location registers HLR and visitor location registers VLR as subscriber registers. Mobile stations MS connect with the mobile exchange MSC by means of base station systems. A base station system BSS consists of base station controllers BSC and base stations BTS. One base station controller BSC is used for controlling several base stations BTS. For the sake of clarity, FIG. 1 shows only one base station system, in which six base stations BTS1–BTS6 connect with the base station controller BSC.

A signal in the GSM system consists of TDMA frames transmitted in succession, each of which contains eight TDMA time slots, which are used as logical channels. Information is transferred as radio-frequency bursts transmitted in the time slots. The logical channels include traffic channels for the calls (speech or data) set up with the mobile radio stations MS located in a cell, and control channels for the signalling carried out with the mobile radio stations MS located in a cell. A speech connection or a data connection can be established on the traffic channels. Typically, a separate connection adapter is required at both ends of a data connection for adapting the data connection to terminal equipments and/or other transmission connections/transmission systems. The connection adapter connected with a terminal equipment is usually referred to as a terminal adapter, and the common adapter located at the network end is referred to as a network adapter.

Figure 2:
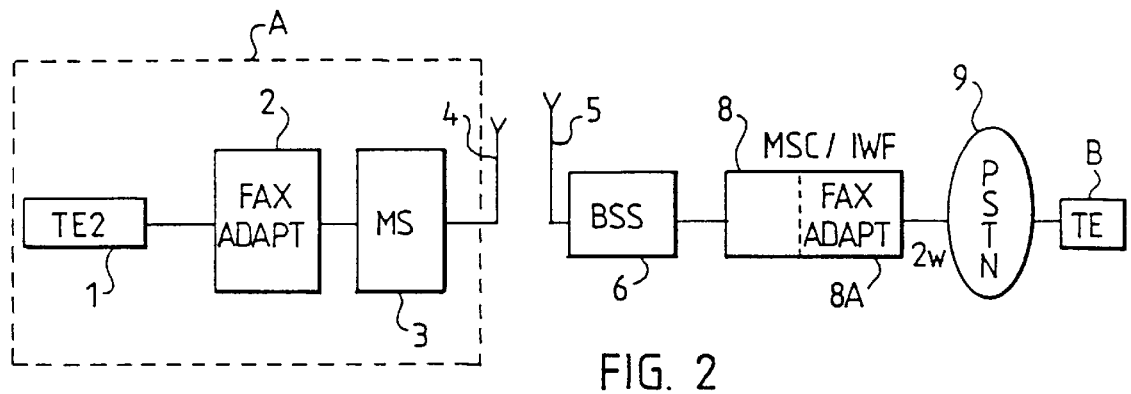
FIG. 2 is a block diagram illustrating the hardware configuration of the Global System for Mobile Communications (GSM) system for telefax transmission.

The hardware configuration for a telefax connection according to the GSM recommendations is illustrated in FIG. 2. A telefax terminal is connected by a normal two-wire modem connection to a special telefax adapter 2, by which the signals of the telefax terminal are adapted to a data connection, which is established via a radio connection between a mobile station MS and the base station system BSS to the mobile exchange MSC and a network adapter IWF located therein, this network adapter containing a second telefax adapter 8A. This second telefax adapter 8A adapts the above-mentioned data connection to a normal two-wire modem connection for instance via a public switched telephone network PSTN 9 to another telefax terminal B.

Figure 3:
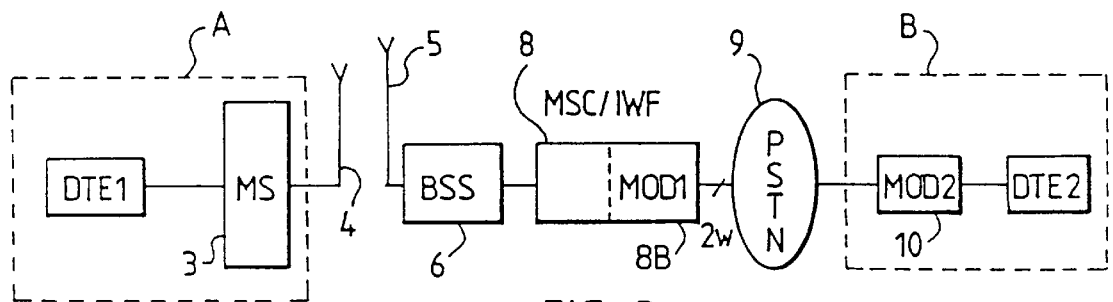
FIG. 3 is a block diagram illustrating the hardware configuration of the GSM system for data transmission.

FIG. 3 illustrates the hardware configuration according to the GSM recommendations for data transmission carried out by means of modems. A radio terminal equipment A consists of a mobile station MS and a data terminal equipment DTE1 connected thereto. A data connection is established from the radio terminal equipment via a radio connection between the mobile station MS and the base station system BSS to the mobile exchange MSC and there further to a network adapter IWF, which contains a data modem MOD1. The data modem MOD1 has a line interface (modem interface), which is connected to a normal two-wire line (2w), which in the exemplifying case is connected via a public switched telephone network PSTN 9 to a remote terminal equipment B, which comprises a remote modem MOD2 and a data terminal DTE2 connected to it. The data modem MOD1 of the network adapter and the remote data modem 10 signal in the normal manner via the modem connection established between them. As for the data terminal equipment DTE1, it controls the operation of the data modem MOD1 via the data connection and transmits data to the data modem MOD1 and correspondingly receives it.

In the GSM system, each service may have its own directory number, MSISDN, Mobile Subscriber ISDN Number. For instance, a subscriber may have a number for a speech service, telefax service and modem service. This numbering is called the multi-numbering scheme. In the multi-numbering scheme, the calling subscriber must know which service relates to which directory number. The services of subscribers are defined in the home location register HLR of a subscriber. In the home location register HLR, each directory number is associated with a corresponding service. In addition, a certain BCIE element, Bearer Capability Information Element, is associated with an MSISDN number in the home location register HLR, the BCIE element indicating the call type and the network resources needed in the call. BCIE is described in the GSM recommendation 04.08, version 4.5.0, pages 423–431.

In the future, it will be possible to use the ISDN BCIE in a GSM network together with the above-described GSM BCIE, this ISDN BCIE being described in the European Technical Standards Institute recommendation ETS 300102-1/Q.931 (Bearer Capability IE), the version in effect as of May 4, 1994 being here referenced. This information element does not directly include call type information, wherefore the information elements High Layer Compatibility (HLC) or Low Layer Compatibility (LLC) are used together with it, these elements being defined in the European Technical Standards Institute recommendations ETS 300102-1/Q.931 HLC and ETS 300102-1/Q.931 LLC. ISDN BCIE (and HLC and/or LLC), the versions in effect as of May 4, 1994 being here referenced, may arrive at a mobile exchange in a call set-up message from a fixed network.

Figure 4:
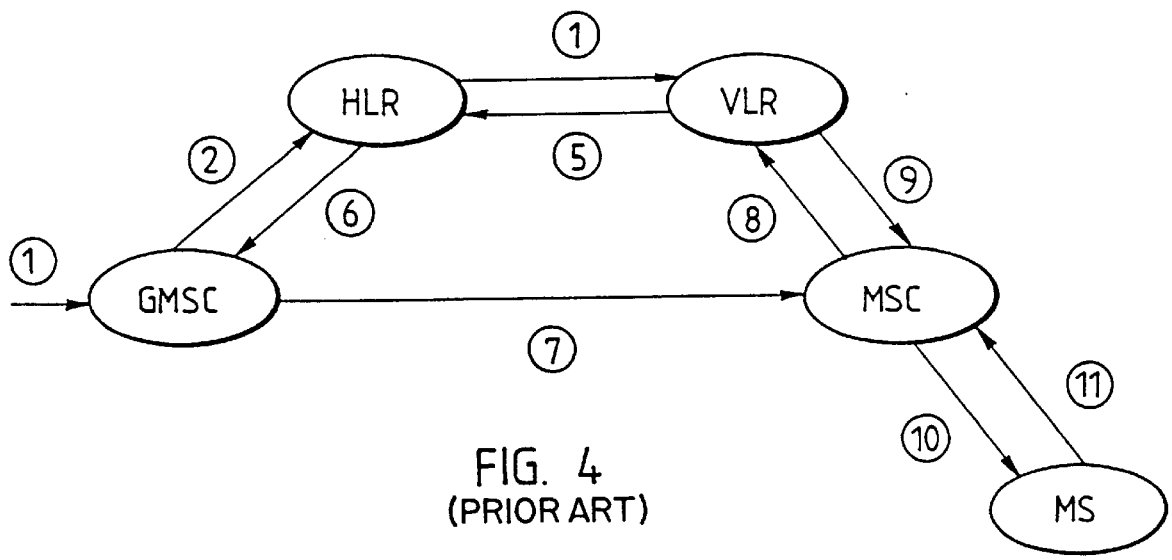
FIG. 4 illustrates a successful call set-up in the GSM system.

In the following, the set-up of a mobile station MS terminating call in the GSM system will be described with reference to FIG. 4, the numbering following the multi-numbering scheme. At stage 1, a call arrives to the first transit exchange GMSC of the network, this transit exchange transmitting a routing information interrogation, message 2, to the subscriber's home location register HLR, which is determined by the directory number MSISDN of the subscriber. The MSISDN number of the subscriber (and possibly ISDN BCIE+HLC+LLC) is also transmitted in the routing information interrogation message 2. During location updating, information on the visitor location register VLR within the area of which the subscriber is located has been updated to the subscriber's home location register HLR. On the basis of this information, the home location register HLR transmits a mobile station roaming number allocation request, message 3, to the visitor location register. The BCIE relating to the MSISDN (or the ISDN BCIE arrived in message 2) is also transmitted to the visitor location register VLR in the mobile station roaming number allocation request, this BCIE indicating, for instance, whether the type of the call is a data call or a speech call. The visitor location register VLR stores the BCIE it has received and allocates a mobile station roaming number MSRN. The visitor location register transmits the roaming number it has allocated, to the home location register HLR in a response message 5. The home location register HLR then transmits the roaming number in a message 6 further to the exchange GMSC which had requested the routing information. The roaming number space is defined in such a manner that the call is always routed to the exchange MSC the visitor location register VLR of which has allocated the roaming number. The transit exchange GMSC can thus route the call forward on the basis of the roaming number by transmitting an initial address message 7 to the mobile exchange MSC indicated by the roaming number.

After having received the initial address message 7, the exchange MSC notices, in a roaming number analysis, that the call is terminating in the area of that particular exchange and it is not intended to be routed further. The MSC thus requests next from its own visitor location register VLR for the information on the called subscriber for call set-up, message 8. In a normal situation, the visitor location register VLR returns the necessary information in a response message 9, this information including, for instance, the BCIE. If the MSC is capable of providing the data transmission resources required by the BCIE, call set-up signalling according to the GSM recommendations is carried out between the MSC and the MS, this signalling being illustrated with arrows 10 and 11. The call set-up proceeds in the above-mentioned manner irrespective of whether what is involved is call set-up for speech transmission or data transmission.

As stated earlier, the subscribers of mobile communication systems can define different call forwarding functions. In unconditional call forwarding, a mobile terminating call is always forwarded to a given forwarding number. In conditional forwarding, a mobile terminating call is forwarded to a determined call forwarding number when a certain condition is fulfilled, for instance when the subscriber is busy, when the mobile station is not reachable, or when the mobile station is reached but the subscriber does not answer within a certain period of time, for instance 30 seconds.

In the GSM system, call forwardings are set and activated basic service group-specifically. When the multi-numbering scheme is used, a mobile subscriber has a separate directory number MSISDN for each service. The subscriber can thus perform call forwardings service-specifically, if there are no other basic services in the same group. The subscriber can, for instance, forward speech calls to a secretary and telefax calls to the office telefax number. Information on the call forwarding functions activated by the subscriber is stored permanently in the home location register HLR of the subscriber. In addition, information on at least the activated conditional call forwardings is also given to the visitor location register VLR serving the subscriber and stored therein.

Figure 5:
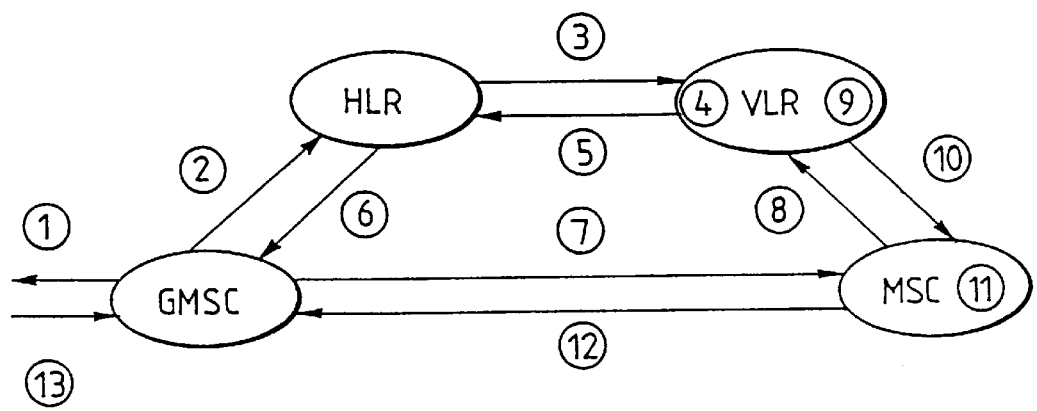
FIG. 5 illustrates a call set-up, with which is connected call forwarding, in the GSM system.

FIG. 5 illustrates the call-set-up procedure of a mobile station MS terminating call, with an associated conditional call forwarding in an exchange MSC serving the mobile station. In FIG. 5, call set-up messages and operations 1, 2, 3, 4, 5, 6, 7 and 8 are entirely similar to the ones described above in connection with FIG. 4. When the VLR receives a subscriber information request 8 from the exchange MSC in the case of FIG. 5, the VLR checks the status of the mobile station MS in the subscriber data and notices, for instance, that the mobile station is busy. Next, the VLR checks in the subscriber data whether the mobile subscriber has activated conditional call forwarding when the subscriber is busy. The VLR notices that the subscriber has such conditional call forwarding to a certain call forwarding number and transmits a response message 9 to the exchange MSC, this message commanding the exchange to perform a call forwarding to the given number. The exchange MSC has a possibility to make an intermediate announcement to the calling subscriber, in which announcement it is declared that the call is forwarded to the call forwarding number. The announcement may be chargeable to the calling subscriber or to the called subscriber. In the exemplifying case of FIG. 5, the exchange MSC makes an announcement to the calling subscriber at stage 11, this announcement being recorded speech, for instance taped or synthesized speech. The announcement is transmitted at stage 12 from the exchange MSC to the transit exchange GMSC and from there further to the calling subscriber, stage 13.

Such an intermediate announcement is not problematic in connection with a speech call. However, intermediate announcements are problematic in data calls, in which the calling modem or telefax terminal waits for an answer from the modem or telefax terminal at the other end only for a predetermines period, which is typically 10–40 seconds. If there is no reply within this period, the calling modem or telefax terminal disconnects the call. The intermediate announcements described above cause a delay to the call set-up, this delay possibly causing the time-out of the calling modem or telefax terminal during call forwarding, and thus an unnecessary release of the call.

To obviate this problem, the visitor location register VLR is arranged, according to the invention, to also provide information in the response message 10 of FIG. 5, in which are given a call forwarding command and a call forwarding number, as to whether the call is a data call or a speech call. This information is preferably a BCIE element. Alternatively, the mobile exchange may also receive BCIE, HLC and LLC in a call set-up message (SETUP), if ISUP signalling is used between the exchanges. If an intermediate announcement is associated with the call forwarding, the exchange MSC is arranged to check the type of the call on the basis of the information provided and to prevent the intermediate announcement from being switched to the calling subscriber if the call is a data call. If the call is a speech call, the intermediate announcement is switched in a normal manner. This is a way of obviating the harmful delay due to intermediate announcements during data calls, such delay possibly causing the time-out of the calling modem or telefax terminal.

Figure 6:
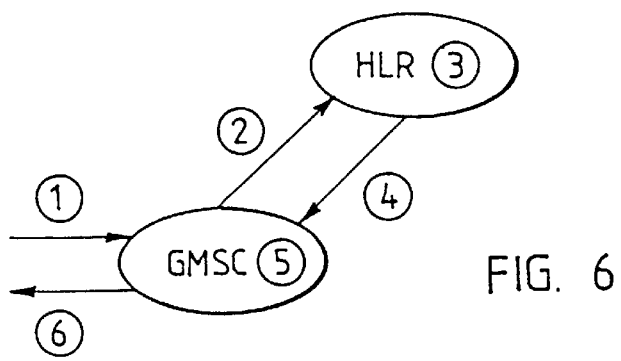
FIG. 6 is a block diagram illustrating a mobile exchange operating according to the invention.

FIG. 6 illustrates a case in which call forwarding is performed in a transit exchange GMSC. The transit exchange receives a mobile terminating call, stage 1, and performs a routing information interrogation to the subscriber's home location register HLR, stage 2, in the same manner as has been described hereinabove in connection with FIG. 4. The HLR notices that there is an unconditional call forwarding for the called subscriber, or that the subscriber has disconnected itself from the network and there is a call forwarding for the subscriber in case of such a situation (stage 3). In the present-day systems, the home location register HLR provides the transit exchange GMSC with a notification of active call forwarding and a call forwarding number in a response message 4. The GMSC performs a call forwarding. If an intermediate announcement is associated with the call forwarding, the GMSC switches the intermediate announcement to the calling subscriber (stages 5 and 6) in the same manner as does the MSC in the case of the embodiment which has been described hereinabove with reference to FIG. 5. A problematic delay as regards the calling modem or telefax terminal is thus produced again.

This is solved according to the invention in such a manner that the home location register HLR provides in the response message 4 information as to whether the call is a data call or a speech call, in addition to providing the call forwarding number. This information is preferably a BCIE element.

Alternatively, the GMSC can use ISDN BCIE, HLC and/or LLC if it obtains these information elements in a call set-up message.

If an intermediate announcement is connected with the call forwarding, the GMSC is arranged to check the type of the call and to prevent the switching of the intermediate announcement in the case of a data call. If the call is a speech call, the intermediate announcement is switched normally. Also in this situation, the delay which is caused by the intermediate announcement and which is problematic as regards the calling modem or telefax terminal is avoided.

Figure 7:
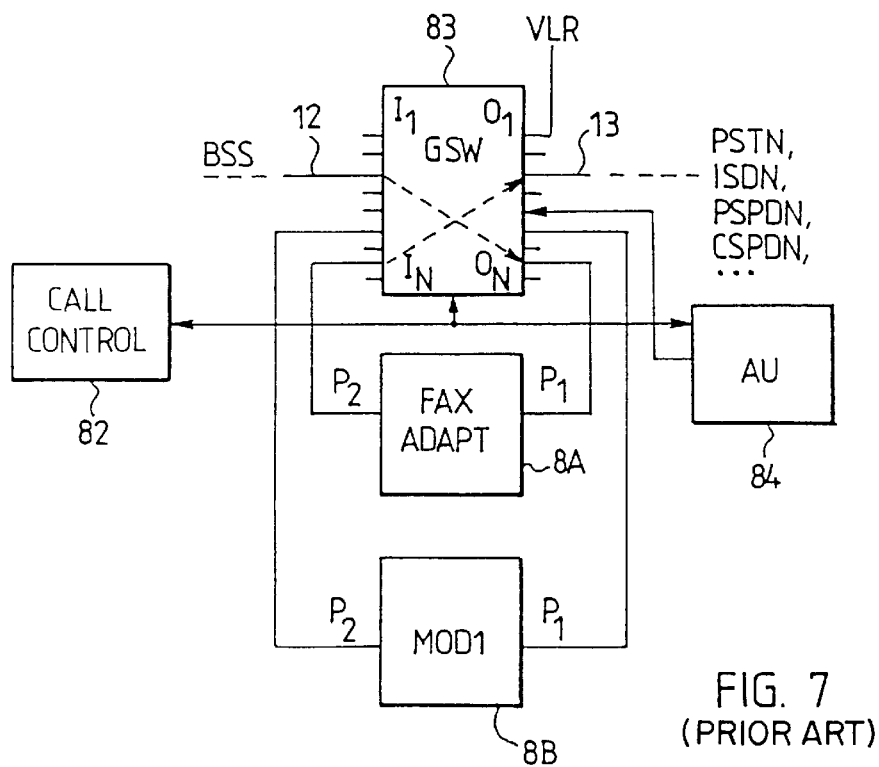
FIG. 7 illustrates another call set-up, with which is connected call forwarding, in the GSM system.

FIG. 7 illustrates a way of applying the invention in a mobile exchange MSC. For the sake of clarity, FIG. 7 shows of the exchange only a switching matrix 83, call control 82, audio announcement unit 84, telefax adapter 8A and modem 8B, but, in practice, the MSC comprises a significant number of different equipments. The switching matrix 83 may be an analog or digital switching device, which selectively switches speech and data connections between the transmission lines 12 arriving from the base station system BSS and the transmission lines 13 leaving the mobile exchange. As an example of such digital exchanges, Nokia Telecommunications DX 220 MSC can be mentioned. A transit exchange GMSC can also be a similar exchange.

Along with the switching matrix 83 are connected the telefax adapter 8A and the modem 8B as network adapters. In the case of a data call, the call control 82 controls the switching matrix 83 to switch a required adapter to the transmission connection in such a manner that the connection according to FIG. 2 or 3 is produced. The network adapters are not essential as regards the invention, however.

The audio announcement unit 84 is also connected to the switching matrix 83. The call control 82 controls the switching matrix 83 and the audio announcement unit 84 in such a manner that the unit 84 can be switched, if necessary, via the switching matrix 83 to make announcements to the calling or called subscriber.

According to the invention, the call control 82 of the exchange, for instance a computer, is arranged to perform the switching of audio announcements during call forwarding in accordance with the flow diagram of FIG. 8. At stage 91, the call control 82 receives a call forwarding command, which contains a BCIE. At stage 92, the call control 82 checks whether an intermediate announcement is connected with the call forwarding. If no intermediate announcement is connected with the call forwarding, the call control proceeds directly to stage 96 to perform the call forwarding. If an intermediate announcement is connected with the call forwarding, the call control 82 checks the type of the call on the basis of the BCIE (or ISDN BCIE+HLC+LLC) at stages 93 and 94. If the call is not a data call, the call control 82 controls the switching matrix 83 and the audio announcement unit 84 to switch the intermediate announcement to the calling subscriber at stage 95. If the call is a data call, the call control omits the intermediate announcement and proceeds directly past stage 95 to stage 96 to perform the call forwarding.

The figures and the description relating thereto are merely intended to illustrate the present invention. In its details, the invention may vary within the spirit and scope of the appended claims.

I claim:

1. An arrangement for carrying out call forwarding in a mobile communication system including mobile stations, mobile exchanges and subscriber databases for maintaining user data, such as location data and activated services, said arrangement comprising:

a mobile exchange provided with means for making an intermediate announcement to a calling subscriber in connection with carrying out activated call forwarding;

said mobile exchange being arranged to:

receive a call to a called subscriber having a directory number;

perform a routing information interrogation to a first database indicated by the directory number of the called subscriber;

observe in the first database that call forwarding is activated for the called subscriber;

start call forwarding;

check on the basis of information obtained from the first database, or from a call set-up message, whether the call is a speech call or a data call; and prevent an intermediate announcement possible associated with call forwarding from being made if the call is a data call, but allowing the intermediate announcement to be made if the call is a speech call.

2. A call forwarding method for a mobile terminating call, comprising the steps of:

receiving a mobile terminating call from a calling subscriber to a called subscriber having a directory number, in a first exchange;

performing a routing information interrogation to a first database indicated by the directory number of the called subscriber;

performing a roaming number interrogation from the first database to a second database, within an area of which the called subscriber is located, thereby obtaining an allocated roaming number;

transmitting the allocated roaming number from the second database to the first database, and further, to the first exchange;

routing the call on the basis of the allocated roaming number from the first exchange to a second exchange, which serves the area of said second database;

observing at the second exchange that the called subscriber is busy, is not reachable or does not answer;

checking in the second database whether call forwarding is activated for the called subscriber and thereby determining call forwarding to be activated for the called subscriber;

initiating the activated call forwarding, with which is possibly associated an intermediate announcement to the calling subscriber;

checking on the basis of information obtained from the second database or from a call set-up message whether the call is a speech call or a data call; and preventing the intermediate announcement from being made to the calling subscriber in case of a data call, but allowing the intermediate announcement to be made to the calling subscriber in case of a speech call.

3. The method according to claim 2, further comprising:

transmitting said information as to whether said call is a speech call or a data call, from the second database to the second exchange, in response to performing a subscriber information interrogation by the second exchange.

4. A call forwarding method for a mobile terminating call, comprising the steps of:

receiving a mobile terminating call from a calling subscriber to a called subscriber having a directory number, in a first exchange;

performing a routing information interrogation to a first database indicated by the directory number of the called subscriber;

observing in the first database that call forwarding is activated for the called subscriber;

starting the call forwarding;

checking on the basis of information obtained from the first database as a result of said routing information interrogation, or from a call set-up message whether the call is a speech call or a data call; and preventing an intermediate announcement associated with the call forwarding from being made, if the call is a data call, but allowing the intermediate announcement to be made, if the call is a speech call.

5. The method according to claim 4, further comprising:

maintaining in the first database a dedicated directory number for each service available to the called subscriber and transmitting from the first database a notification of the call forwarding, a call forwarding number, and information concerning whether the call is a speech call or a data call, to the first exchange, when the first database receives the routing information interrogation for the directory number of the called subscriber and call forwarding is observed to be activated for the called subscriber.

6. The method according to claim 3 or claim 5, wherein:

said information transmitted as to whether said call is a speech call or a data call is transmitted as a Bearer Capability Information Element.

\* \* \* \* \*